Patented Sept. 20, 1932

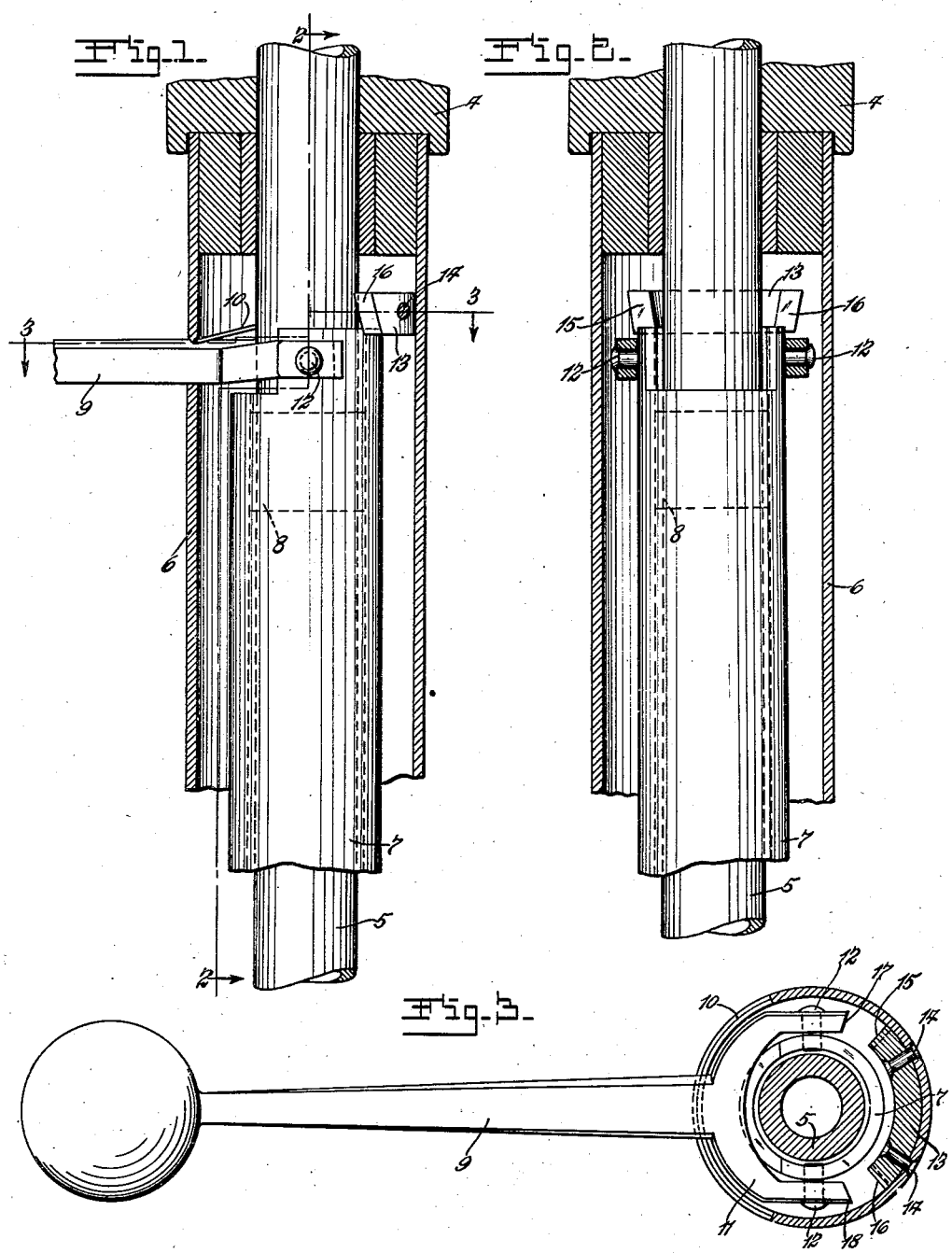

1,877,889

UNITED STATES PATENT OFFICE

ELMER G. KESLING, OF BLOOMFIELD, MISSOURI

CONTROL FOR SPEED CHANGING MECHANISM

Application filed April 10, 1931. Serial No. 529,023.

This invention relates to control for speed changing mechanism; and relates specially to devices for controlling the speed changing mechanism used in automobiles and other motor vehicles.

An object of the invention is to provide improved means for selectively controlling the speed changing mechanism used to shift the gears of a variable speed gear transmission of the "free wheeling" type in order to limit the extent of movement of the shifted gears in opposite directions from a central neutral position to positions to obtain the effect of "free wheeling," or to continue the movement of said shifted gears to positions to obtain the effect of positive engagement and drive, at the option of the operator.

Another object of the invention is to provide means whereby the required shifting movements may be optionally limited or continued, as desired, through the proper manipulation and operation of a single operating means.

For convenience of illustration, the present invention is shown combined with the control shaft for the speed changing mechanism that constitutes the subject matter of my copending application, Serial No. 520,942, filed March 7, 1931, in which the said control shaft is supported for longitudinal and rocking movements about the steering column of an automobile. However, the invention may be readily combined or used in connection with many other types of speed changing mechanisms and the embodiment chosen for illustration is not a limitation of use.

Other objects of the invention will be apparent from the following description, reference being made to the accompanying drawing, in which—

Fig. 1 is a longitudinal sectional view of a portion of the steering column of an automobile having my invention in association therewith.

Fig. 2 is a vertical sectional view approximately on the line 2—2 of Fig. 1 at right angles to the plane of the section of Fig. 1.

Fig. 3 is a transverse sectional view approximately on the line 3—3 of Fig. 1.

A part 4 of the usual steering wheel is shown attached to the upper end of a steering shaft 5 rotatively supported within a tubular housing 6.

According to the present form of the invention and as shown in my said copending application, Serial No. 520,942, I utilize the usual housing 6 to enclose and to cooperate with essential parts of the present invention by operation of which the speed changing gears (not shown) are shifted laterally from their central neutral position to "free wheeling" positions or to positive drive positions, as desired.

A tubular shaft 7 is mounted in the housing 6 and encloses a portion of the shaft 5. The shaft 7 is supported and guided about the shaft 5 by means of bushings 8, so that said shaft 7 may turn and move longitudinally with respect to the shaft 5.

A lever 9 extends through an inclined slot 10 in the housing 6 and has on its inner end a bifurcation 11 between the arms of which the shaft 7 is embraced. The lever 9 extends through the slot 10 and the bifurcation 11 is entirely within the housing 6, so that said lever 9 is enabled to fulcrum against the upper and lower walls of the slot 10 and to move laterally along the slot 10 without any interference by the bifurcation. Pivots 12 connect the arms of the bifurcation 11 with diametrically opposite portions of the tubular shaft 7, so that proper manipulation of the lever 9 will move the shaft 7 longitudinally along the shaft 5, or will turn the shaft 7 about said shaft 5, as desired.

In the preceding description, I have applied to the different parts mentioned the same reference numerals that are applied to said parts in the drawings of my said application, Serial No. 520,942. It is in connection and combination with these parts that my present invention is designed and arranged in order to limit extent of movement of the lever 9 from its central or neutral position in order to obtain the effect of "free wheeling," or to permit said lever 9 to be moved to positions to obtain positive engagement of the transmission gears (not shown) for positive drive.

The term "free wheeling," as used in this specification, has reference to gearing capable of control to permit a motor vehicle to travel faster than the operation of the motor while the motor is running and the clutch is in engagement. A type of such gearing is disclosed in my prior application, Serial No. 526,276, filed March 30, 1931.

In Fig. 3 of the drawing, the lever 9 is shown in its central neutral position. Said lever 9 is movable laterally along the slot 10 in both directions from its central neutral position. Movement of the lever 9 laterally in either direction from its central neutral position to a position about half way to the end of the slot 10 places said lever 9 in a free wheeling position in which the vehicle may travel faster than the operation of the motor while the motor is running and the clutch is in engagement. In the present invention, the outer end of the lever 9 must be depressed so as to raise the inner end of said lever in order to stop swinging movement of said lever 9 in the free wheeling positions. It is known that this longitudinal shifting of the shaft 7 is necessary in the operation of the speed changing mechanism. Accordingly, when the shaft 7 is moved longitudinally in an upward direction, the inner ends of the arms 11 of the lever 9 are brought into cooperative relationship to a stop device, which will positively limit extent of movement of the lever 9 along the slot 10 and thereby positively stop turning of the shaft 7 in either of two free wheeling positions, depending upon in which direction the lever 9 is moved from its central neutral position.

An arcuate abutment element 13 is mounted in connection with the inner surface of the housing 6 opposite from the side of said housing in which said slot 10 is formed. This abutment block is rigidly attached to the housing 6 by rivets 14, or other appropriate fastening means.

The ends 15 and 16 of the abutment member 13 are in planes that are approximately radial to the axis of the shaft 7 and both ends of said abutment member are beveled from the upper edge to the lower edge. This construction provides an arrangement in which the upper side of the abutment member 13 is longer than the lower side of said member.

The ends 17 and 18 of the arms 11 are beveled radially but do not incline from the lower to the upper edge or vice versa.

The present invention is combined with the shaft 7 of my said application, Serial No. 520,942, in order to cause said shaft to shift the variable speed gearing of my application, Serial No. 526,276. It is known that depression of the outer end of the lever 9 and consequent longitudinal movement of the shaft 7 toward the steering wheel 4 is necessary before the lever 9 is moved laterally along the slot 10 in order to rock the shaft 7 and cause said shaft 7 to shift the gearing to either free wheeling position or beyond said free wheeling positions to positive second speed drive or to positive high speed drive, respectively. This depression of the outer portion of the lever 9 places the ends 17 and 18 of the arms 11 of said lever opposite the ends 15 and 16 of the abutment element 13. Consequently, when the lever 9 is in this depressed position in which the ends 17 and 18 of the arms 11 of said lever are opposite the ends 15 and 16 of the abutment member 13, lateral movement of said lever 9 along the slot 10 in either direction from the central neutral position of said lever will be stopped. This movement of the lever 9 is stopped when said lever 9 is about half way to the end of its extreme movement.

After turning movement of the shaft 7 has been stopped by engagement of the ends 17 and 18 in the manner described in order to obtain free wheeling, the lever 9 may be operated to a sufficient extent to disengage the ends 17 and 18 from the ends of the abutment 13 without disturbing the selection obtained in the gearing. Then, after the ends 17 and 18 have become disengaged from the ends of the abutment member 13, the lever 9 may be moved along the slot 10 to shift the gearing to positive drive engagement. These operations are made possible because of the lost motion or lash contained in the connections from the shaft 7 to the parts operated thereby.

To shift to either of the positive drive positions, the lever 9 is fulcrumed against the lower wall of the slot 10 so as to move the shaft 7 the full extent required to make the selection and is then moved laterally along the slot 10 and, after a portion of such lateral movement along the slot 10, the lever 9 is fulcrumed against the opposite wall of the slot 10 and operated to move the ends 17 and 18 of said lever out of alinement with the ends 15 and 16 of the abutment member 13. The lever 9 is moved continuously along the slot 10 until the positive drive connections are obtained.

It is now clear that the present invention is capable of easy embodiment in the construction comprising the inventions disclosed in my copending applications Serial No. 520,942 and Serial No. 526,276 without any displacement or substitution of parts. By use of this device, the actuator shaft 7 of my application, Serial No. 520,942, is effectively controlled so as to obtain the effects of free wheeling or positive drive by a type of gearing such as that shown in my application, Serial No. 526,276, or variations thereof. The effect of free wheeling may be optionally obtained or not, as desired. The mode of operation of the lever 9 is not substantially changed from the intended operation of said lever as disclosed in my application, Serial No. 520,942, so that no difficulties are encountered in the use and operation of this invention.

The invention may be considerably varied within the scope of equivalent limits without departure from the nature and principle thereof. I contemplate such variations as may be considered useful or desirable to adapt the invention to its environments and to different types of gearing. What I claim and desire to secure by Letters Patent is:

1. In a control for speed changing mechanism, a tubular housing, a shaft supported in said housing for longitudinal and rocking movements, a lever extending through the wall of said housing and having one end pivoted to said shaft for imparting longitudinal and rocking movements to said shaft, and an abutment rigid in said housing in position to be engaged by the end of said lever in one operated position of said lever to limit extent of turning movement of said shaft by said lever.

2. In a control for speed changing mechanism, a housing having a slot therein, a shaft supported for longitudinal and rocking movements in said housing, a lever extending through said slot and arranged to fulcrum against the walls thereof to move said shaft longitudinally and to move laterally through said slot to turn said shaft, means pivotally connecting said lever with said shaft, and an abutment rigid in said housing in position to be engaged by said lever when said lever is operated to move said shaft longitudinally and is moved laterally through said slot to turn said shaft.

3. In a control for speed changing mechanism, a housing having a slot therein, a shaft supported for longitudinal and turning movements in said housing, a lever extending through said slot and arranged to fulcrum against the walls thereof to move said shaft longitudinally and to move laterally along said slot to turn said shaft, and an abutment rigid in said housing in position to be engaged by said lever to limit extent of lateral movement of said lever in one of the positions to which said lever is moved by fulcruming on a wall of said slot.

4. In a control for speed changing mechanism, a housing having a slot therein, a shaft supported for longitudinal and turning movements in said housing from a central neutral position to free wheeling positions or to positive drive positions as desired, a lever extending through said slot and having one end pivoted to said shaft for imparting longitudinal and turning movements to said shaft, and an abutment cooperating with said lever to stop said lever and thereby said shaft in free wheeling positions at the option of the operator.

5. In a control for speed changing mechanism, a shaft supported for longitudinal and turning movements from a neutral position to free wheeling positions and to positive drive positions, a combined guide and fulcrum device, a lever pivoted to said shaft and operating on said guide and fulcrum device to impart longitudinal and turning movement to said shaft from said neutral position to said free wheeling positions and to said positive drive positions, and an abutment cooperating with said lever to prevent said lever from turning said shaft beyond free wheeling positions at the option of the operator.

6. In a control for speed changing mechanism, a shaft supported for longitudinal and turning movements from a central neutral position to free wheeling positions or to positive drive positions as desired, a lever for imparting longitudinal and turning movements to said shaft to said free wheeling positions and to said positive drive positions, abutments rigid with said lever, and an abutment supported in a rigid position for engagement by said first abutments to stop said lever and thereby said shaft in free wheeling positions at the option of the operator.

7. In a control for speed changing mechanism, an element movable from central neutral position to free wheeling positions and to positive drive positions as desired, a lever having permanent pivotal connection with said element for moving said element from said central neutral position to said free wheeling positions and to said positive drive positions and having abutments rigid therewith, and an additional abutment mounted in a rigid position for engagement by said abutments on said lever to stop said lever and thereby said element in free wheeling positions at the option of the operator.

8. In a control for speed changing mechanism, an element having a central neutral starting position from which said element is movable to free wheeling positions and to positive drive positions as desired, a lever having permanent pivotal connection with said element and being operative to move said element from said central neutral starting position to said free wheeling positions and to positive drive positions, an abutment rigid with said lever, and an additional abutment mounted in a rigid position for engagement with said abutment on said lever to stop said lever and thereby said element in one of said free wheeling positions at the option of the operator.

9. In a control for speed changing mechanism, an element having a central neutral starting position and being movable therefrom to a free wheeling position and to a positive drive position as desired, a lever having permanent pivotal connection with said element for moving said element from said central neutral starting position to said free wheeling position and to said positive drive position, a fulcrum against which said lever operates, an abutment in rigid connection with said lever, a rigid support, and an additional abutment rigid on said support in position for engagement by said abutment on said lever to stop said lever and thereby said element in said free wheeling position at the option of the operator.

10. In a control for speed changing mechanism, an element shiftable from a central neutral starting position to a plurality of free wheeling positions and to a plurality of positive drive positions as desired, a lever having permanent pivotal connection with said element for shifting said element from said central neutral starting position to any of said free wheeling positions and to any of said positive drive positions as desired, a number of abutments rigid with said lever, and a rigid abutment element supported in position for engagement by said abutments to stop said lever and thereby said element in said free wheeling positions at the option of the operator.

11. In a control for speed changing mechanism, an element shiftable from a central neutral starting position to a number of free wheeling positions and to a plurality of positive drive positions as desired, a lever permanently pivoted to said element, means for guiding and fulcruming said lever when said lever is operated to shift said element from said starting position to any of said free wheeling positions and to said positive drive positions, abutments rigid with said lever, and stationary abutments located in positions to be engaged by said first named abutments respectively to stop said lever and thereby said element in the respective free wheeling positions at the option of the operator.

12. In a control for speed changing mechanism, a shaft supported for longitudinal and turning movements from a central neutral starting position to free wheeling positions and to positive drive positions as desired, a lever for imparting said longitudinal and turning movements to said shaft, and means cooperating with said lever to stop said lever and thereby said shaft in free wheeling positions at the option of the operator.

13. In a control for speed changing mechanism, a shaft supported for longitudinal and turning movements from a central neutral starting position to free wheeling positions or to positive drive positions as desired, abutments for stopping movement of said shaft in free wheeling positions, and a lever pivotally connected with said shaft for operating said shaft to positive drive positions or to cause said abutments to stop said shaft in free wheeling positions as desired.

14. In a control for speed changing mechanism, an element movable from central neutral starting position to free wheeling positions and to positive drive positions as desired, a lever, arms on said lever pivoted to diametrically opposite sides of said element and having abutments on the ends thereof, a fulcrum and guide device for said lever, and additional abutments supported in position to be engaged by said first named abutments to stop said lever and thereby said element in free wheeling positions at the option of the operator.

ELMER G. KESLING.